March 17, 1925. 1,529,906
T. A. MORRIS
TEMPERATURE REGULATOR FOR INTERNAL COMBUSTION ENGINES
Filed June 17, 1919 2 Sheets-Sheet 2
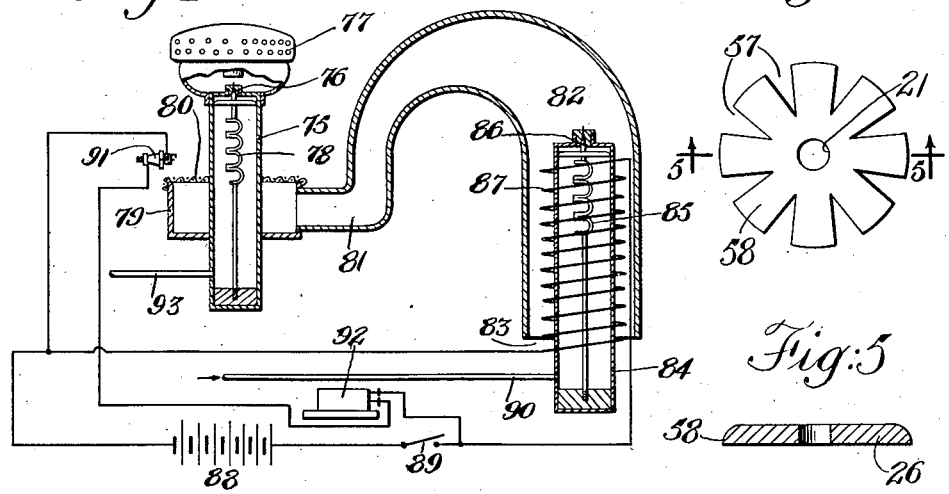
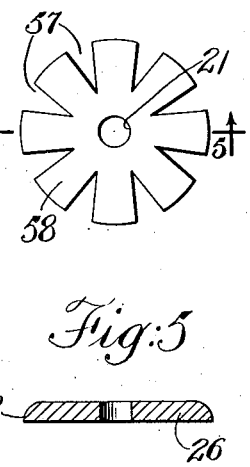
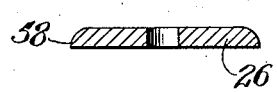
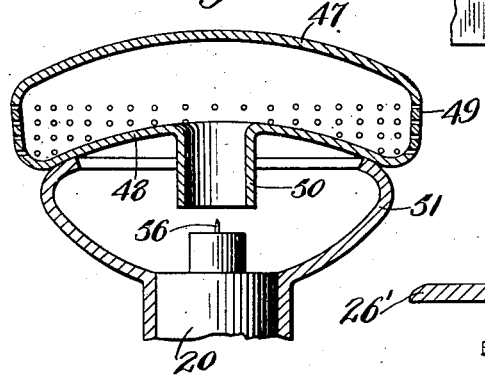
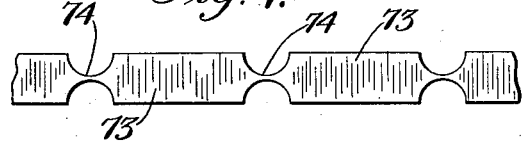
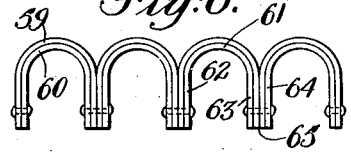
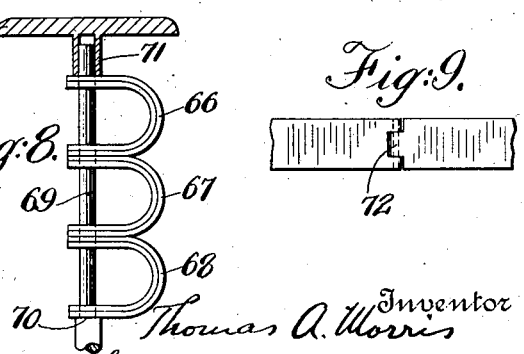
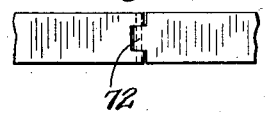
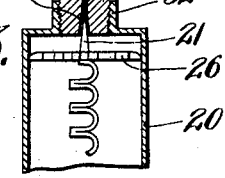
Inventor
Thomas A. Morris
By his Attorney
Thomas Howe Patented Mar. 17, 1925.

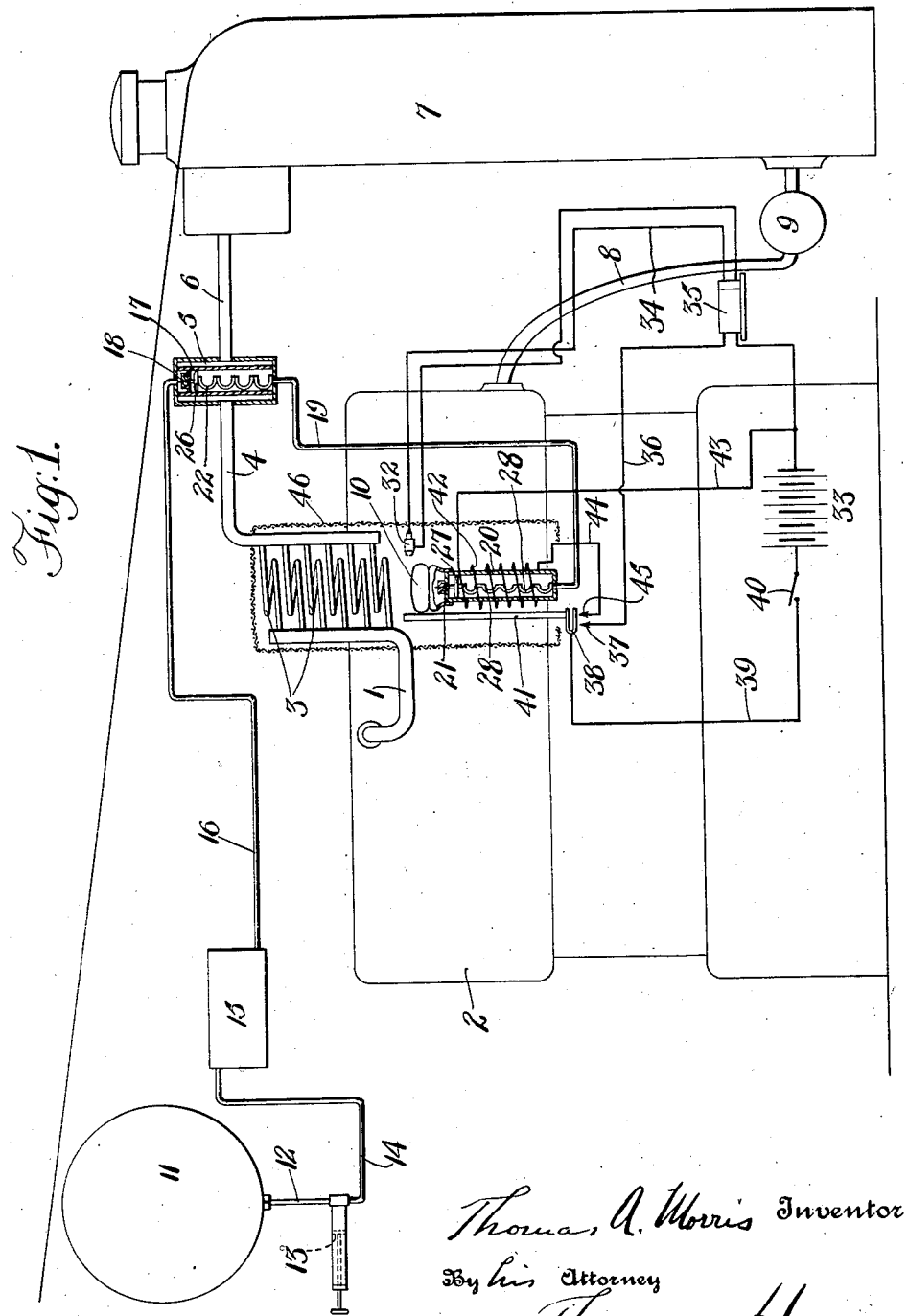

1,529,906

UNITED STATES PATENT OFFICE.

THOMAS A. MORRIS, OF NEW YORK, N. Y., ASSIGNOR TO LIQUID RECORDING INSTRUMENT COMPANY, INC., A CORPORATION OF NEW YORK.

TEMPERATURE REGULATOR FOR INTERNAL-COMBUSTION ENGINES.

Application filed June 17, 1919. Serial No. 304,965.

*To all whom it may concern:*

Be it known that I, THOMAS A. MORRIS, a citizen of the United States of America, residing at city, county, and State of New York, have invented new and useful Improvements in Temperature Regulators for Internal-Combustion Engines, of which the following is a specification.

This invention relates to means for regulating the temperature of internal combustion engines.

It is well known that engines of the internal combustion class operate better at a temperature considerably above that of the atmosphere. For that reason such engines operate better after they have been running long enough to "heat up." In the cases of large engines, and where they are used upon motor vehicles, the engine does not become heated to the most efficient temperature until a long distance has been traveled. When the vehicle is only used for short runs it may be that this temperature will seldom, if ever, be attained and consequent inefficiency of the engine will result. The engine may, under some operating conditions such as are produced by improper timing of the spark, proportioning of the combustible charge etc., or by unusually extended use, become over heated.

It is an object of the present invention to provide means for simply and reliably regulating the temperature of the engine.

Usually the engines on motor vehicles are provided with a jacket water circulating system to prevent overheating and in such cases the invention may take the form of an automatically regulated heater for maintaining the temperature of the engine.

As above stated, motor vehicle engines usually have a jacket water system and this provides an admirable medium through which to regulate the temperature of the engine. Also this provides a means for maintaining the temperature of the jacket water at a proper value so that the water will not freeze when the car is standing in the street or in an unheated garage. By this means it may be that heating of the garage may be done away with, which would be a considerable saving of labor and expense.

It is therefore another object of the present invention to provide means for regulating the temperature of the engine jacket water.

In connection with the above stated objects, there has been developed a new form of burner and it may therefore be stated to be an ancillary object of the invention to provide a new and improved burner. Also there has been devised a new and improved regulation of the fuel supply for the burner so that a further object of the invention may be stated to be the provision of improved means for this purpose.

Also there has been devised an improved form of thermostatic element which constitutes a further object of the invention.

It will be apparent that a number of the above objects, while attainable in connection with the regulation of the temperature of an internal combustion engine and its jacket water, they are not, nevertheless, limited to such applications, but these objects may be attained and the apparatus for attaining them may have a wide variety of uses.

Other and ancillary objects of the invention will appear hereinafter.

In the accompanying drawings which illustrate the invention,

Fig. 1 is a diagrammatic view showing the application of the invention to the heat regulation of the jacket water of an internal combustion engine, Fig. 2 is a sectional view on an enlarged scale of the burner, Fig. 3 is a sectional view on the same scale as Fig. 2, of the needle valve controlling the supply of fuel to the burner and its adjacent devices, Fig. 4 is a top plan view on an enlarged scale of the piston for guiding the needle valve, Fig. 5 is a section on the line 5—5 of Fig. 4.

Fig. 6 is a side elevation of one form of thermostatic element,

Fig. 7 is a plan view of a strip from which a thermostatic element is formed before the strip has been bent into U-shapes, Fig. 8 is a side elevation of another form of thermostatic element, and Fig. 9 is a plan view of a modified form of connection between adjacent U's of the thermostatic element.

Fig. 10 shows a modified form of the invention.

Referring to the drawings, the pipe 1 leads from the jacket of the internal combustion engine 2 to coiled pipes 3 within which the water is heated and thence the water is conducted through a pipe 4, through the jacket 5 of a thermostatic device to be hereinafter referred to, and a pipe 6 to the usual automobile radiator 7. The return from the radiator to the engine jacket takes place through the pipe 8 and the circulation may be accelerated by a suitable rotary pump 9 inserted in the pipe 8 and driven after any of the well known suitable ways now employed for causing circulation of the cooling water of an automobile or any other internal combustion engine.

The coils of pipe 3 may be heated by means of a burner 10 supplied with liquid fuel from the usual gasolene tank found on automobiles or from other suitable sources. The manner of supplying and regulating this fuel will now be referred to.

Gasolene may be supplied from the usual automobile storage tank 11 through a pipe 12 to the pump 13 by which it may be forced through the pipe 14 into the receiving tank 15. The fuel in the tank 15 is thus maintained under a suitable head for forcing the gasolene to the subsequent apparatus. This head may be due to the elevation of the tank 15, when the head will be due to gravity, or it may be due to the compression of air in the tank 15 as the fuel is pumped into it or it may be a combination of these methods or other effective means may be employed. From the tank 15 a pipe 16 leads to the chamber 17 surrounded by the jacket 5 as before referred to, communication of the pipe 16 with the chamber 17 being effected through the needle valve 18. From the chamber 17 the fuel may pass through the needle valve 21 to the burner 10.

The needle valve 18 is operatively connected to a thermostatic element 22 arranged to elongate as it is heated. At its opposite end from that at which it is connected with the needle valve 18, the element 22 is mounted upon the end of the chamber 17. It is also to be observed that the needle valve 18 is mounted in a piston or plunger 26 sliding in the cylinder enclosing the chamber 17 so that the needle valve is properly guided in its motion to and from its seat. To permit the passage of the fuel, the piston 26 should be perforated or notched. Similarly the needle valve 21 is mounted upon a plunger 27 having provision for the passage of gasolene, which plunger and valve are connected to one end of a thermostatic element 28 similar to the element 22, but oppositely arranged so that it elongates on cooling and shortens on heating. Like the element 22, the element 28 is connected at its end opposite the needle valve with the end of the cylinder 20.

For initially lighting the gasolene at the burner 10 a spark plug 32 may be employed. This spark plug derives its current from the battery 33, one terminal of the spark plug being connected through the wire 34 with the secondary of an induction or spark coil 35, the other terminal of the spark plug being connected with the other secondary terminal, one terminal of the primary of the spark coil is connected through the conductor 36, contact 37, thermostatic element 38, conductor 39 and switch 40 with one terminal of the battery the other terminal of the battery being connected with the other terminal of the primary of coil 35. The thermostatic element 38 is arranged so as to expand and close the circuit at 37 upon cooling and is connected in good heat conducting relation to a copper bar 41 which extends along side the cylinder 20 and along side the burner 10 so that the heat when the burner is lighted is conducted to the element 38 and causes it to be removed from engagement with the contact 37.

To initially heat the element 28 so as to open the valve 21 and permit the fuel to flow to the burner 10, an electric heating coil 42 is placed about the cylinder 20, one terminal of this coil being connected through the conductor 43 with one terminal of the battery 33, while the other terminal of the heating coil is connected through a conductor 44, contact 45, element 38, conductor 39 and switch 40 with the other terminal of the battery 33. It will be thus observed that the operation of the thermostatic element 38 will open and close the circuits of the heater and spark plug simultaneously.

In order to prevent fire being transmitted from the burner 10 to an undue distance and thereby prevent any undesirable conflagrations or explosions from emanating from the burner, the burner may be enclosed in a cylinder 46 of wire gauze through which ignition cannot be transmitted.

To trace the operation more in detail, let it be assumed that gasolene has been suitably pumped in to the reservoir 15 and that the hand switch 40 has been closed. Let it be assumed that the engine is in a cool condition, the jacket water will be cool, thereby cooling down the element 22 causing the needle valve to open. The gasolene will then have a clear passage through the pipe 19 to the interior of the cylinder 20. Inasmuch, however, as the engine is supposed to be in a cool condition and with the burner 10 extinguished, the needle valve 21 will be seated and so cut off the supply of gasolene to the burner. The burner being extinguished and the copper bar 41 being cold, the element 38 will be spread so that it engages with the contacts 37 and 45.

The circuit of the electric heat coil 42 and of the spark plug being thus closed, the spark plug will be sparking while the coil 42 will warm up the cylinder 20 and its contents including the thermostatic element. When this element has been heated to a certain degree the valve 21 will be opened thereby permitting a flow of gasolene to the burner and this gasolene will be ignited by the spark plug. The heat of the burner will now heat the copper bar 47 which will conduct the heat to the thermostatic element 38 and this will shortly result in causing the contraction of that element and the opening of the spark plug and heater circuits at the contacts 37 and 45. This will not result, however, in the closing of the valve 21 so long as the burner continues burning as the heat from this burner will be conducted down along cylinder 20 so as to maintain the element 28 at a sufficiently high temperature to keep the valve open, and care should be taken to make the parts of sufficiently massive metal so that sufficient heat for this purpose will be transmitted.

The heat from the burner also ascends through the coils 3 thereby heating them and their contained jacket water. This jacket water affects the element 17 and with rising temperature decreases the opening of the valve 18, so that the supply of gasolene to the burner is cut down and the heating of the jacket water diminished. This takes place whether the heating of the jacket water is due to the burner referred to or whether it is due to the heat generated by the operation of the engine. From whatever cause the rise in temperature of the jacket water may take place a corresponding cutting down of the fuel and reduction in heat of the burner 10 is effected. It may be that the temperature of the jacket water will become such that no heat at all will be required from the burner 10, this being the case where the operation of the engine generates sufficient heat to maintain it at the desired temperature. When this takes place the burner may be extinguished, but it will be relighted and brought into operation again when required, in the manner as before stated. When, for any reason, as for instance, when an automobile is to be stored in a building maintained at a suitable temperature, the apparatus may be thrown out of action by extinguishing the burner and opening switch 40. The valve 21 will then close, shutting off the gasolene from the burner while both the spark plug and electric heating coil will be open-circuited at the switch 40. To place the apparatus again in operation it will be simply necessary to close the switch 40.

Referring now to Figs. 2 to 6 inclusive, the burner 10 and its regulating means will be referred to more in detail. The burner 10 comprises an enclosed annular metal chamber having the top concave portion 47 joined to the convex bottom 48 by means of a perforated band or cylinder 49. Depending from the center of the bottom 48 is a neck or tube 50 through which the gasolene shoots upwardly and comes against the central part of the concave plate 47, whence it flows to the perforations in the plate 49 at which the flame is formed. The receptacle or chamber thus referred to is supported by a shell 51 of metal which is secured to and supported by the sides of the cylinder 20. This shell should be made of comparatively thick material and extend for a considerable length along the sides of the cylinder 20 so that sufficient heat will be transferred from the burner to the thermostatic element within the chamber 20 to regulate the fuel valve as before described. The fuel valve is more particularly shown in Fig. 3 wherein it will be seen that the cylinder 20 has a neck 52 formed at its upper end into which is screwed a plug or nipple 53. In this plug is formed the conical seat 54 for the needle valve 21. Between the seat for the needle valve and the top of the plug extends the cylindrical opening 55 and through this opening is adapted slide a cylindrical rod or pin 56, the cross section of which is considerably smaller than the bore of the opening 55 so that when the needle valve leaves its seat, gasolene may flow through the plug. As the needle valve is moved to and fro by the expansion and contraction of the thermostatic element to which it is attached, not only will the valve be moved to regulate the flow of gasolene but the pin will act as a cleaner to clear up anything which may tend to clog the hole through the plug.

The piston 27 upon which the needle valve 21 is mounted which is shown in plan view in Fig. 4 and in section in Fig. 5, is provided with the segmental notches 57 to permit the passage of the gasolene as already referred to and has its edges chamfered so as to cause the sharp edge at 58. The latter provision making a scraper of the plug which tends to scrape the interior of the cylinder 20 free from any deposit which may occur, and at the same time act as a guide for the valve.

The thermo. element 28 may consist of a number of U-shaped pieces bolted or riveted together as shown in Fig. 6, each U-shaped portion comprising a strip of brass 59 along side a strip of steel 60. Inasmuch as the brass has a very much higher coefficient of expansion than steel (nearly twice as much) the tendency of increasing temperature is to throw the sides of each U-shaped portion together and the movement over all of a series of the U-shaped elements would be that due to the sum of the movements of all of them, and consequently with the arrangement of steel and brass strips as described, the thermostatic element 28 would shorten under increase in temperature by an amount which is equal to the sum of the shortenings of the individual U's. It will be seen that in the structure of Fig. 6, each U consists of a bight 61 and two legs 62 and 63. It will also be observed, however, that in joining, two U's together this leg 63 forms with the leg 64 of an adjacent U, an oppositely facing U having a bight at 65. If the series of U's should be made of material continuous from one end to the other of the element and the U's facing in both directions be made of uniform size, then it will be observed, that each U facing in one direction would tend to spread its sides apart under increase in temperature while its adjacent U, facing in the opposite direction, would have the opposite tendency, and, they being of uniform size, the resultant movement over all would be zero. It will be noticed that this must necessarily be the case because whereas in the U consisting of the steel and brass strips 59 and 60 in Fig. 6, the U would tend to spread under decrease in temperature, the adjacent U would have the metals reversed, that is the steel would be on the outside and the brass on the inside. This neutralization of the temperature effect may be prevented by making the U's non-uniform or making the strips discontinuous, thus in the element as shown in Fig. 6, the U's are separately formed and riveted together. By this means the strips are rendered discontinuous, the breaks occurring in the centers of the U's facing in the opposite direction from those which produce the desired effect. Also the adjacent U's as 66, 67 and 68 might be threaded upon a rod 69, this rod passing through holes in the legs of the U's. The U's slide easily on the rod, and are not secured together but simply abut against each other and against a shoulder 70 on the rod, the other end of the element bearing against the sleeve 71 fixed to the needle carrying plunger 26 and telescoping on the end of the rod 69. The adjacent ends of adjacent U's might also be held in operative relation but the metallic continuity broken up by means of a hinged joint 72 as shown in Fig. 9.

As before stated the neutralization of the temperature effect may be accomplished by making the U's non-uniform. Thus the element as shown in Fig. 6 would produce the desired effect if instead of rivetting the adjacent U's together, the strips were made continuous. There it will be observed that the sides of adjacent U's are brought so close together that the bights of the U's facing in the opposite direction from the U's producing the desired effect are reduced to almost nothing. The result is that the effect of such U's is very small even where the metal strips are continuous throughout the thermostatic element, and are so small as compared with the U's facing in the opposite direction, that they are very much overbalanced so that the desired effect is produced although it is slightly lessened by the smaller neutralizing effect of the reversely facing U's.

The opposition to the desired effect may also be lessened where the element is made of continuous strips by decreasing the cross section of the strips at the bights of the undesirable U's and by making these bights as small as possible as has been before described. At it is only necessary that the section at these undesirable bights shall be sufficient to hold the U's in operative relation the cross section can be made quite small. Thus strips having a plan as shown in Fig. 7 may be employed, the strips being so bent that the broad sections 73 form U's facing in one direction and with the component strips of brass and steel so arranged as to give the desired expansion or contraction of the width of the U, while the reduced sections 74 form the bights of the oppositely facing U's, which bights connect the larger U's 72 together, the strips being bent up into the form as shown in Fig. 6, and in fact being identical therewith except that the strips are continuous and with the reduced portions 74 forming the bights correspond to the narrow bights 65 of Fig. 6.

Referring to Fig. 10, the heater comprises a cylinder 75, a needle valve 76, a burner 77 and a thermostatic element 78, of a construction as described in connection with the burner 10 and other related elements in Fig. 1. Surrounding the heater is a pilot burner comprising the vessel 79 having its top covered with wire gauze 80. Communicating with the vessel 79 is a pipe 81 leading from a mixing chamber 82 open to the atmosphere at its bottom 83 and having inserted within it means for feeding gasolene to the chamber. The gasolene feeding means comprises a cylinder 84 of very thin metal so that it will readily conduct heat from its exterior to the thermostatic element 85 within it. This element is arranged to control a needle valve 86 constructed and arranged like that shown in Fig. 3. About the cylinder 84 is an electric heating coil 87 which is supplied with current from the battery 88 when the switch 89 is closed. Gasolene is fed under pressure to the cylinder 84 from any suitable source through a pipe 90. To initially light the pilot burner, a spark plug 91 is supplied which is furnished with current through the spark coil 92 when the switch 89 is closed. Gasolene under pressure is supplied to the cylinder 75 from a suitable source through the pipe 93. This supply may be controlled by a thermostatic regulator exposed to the heated medium to be controlled such as the thermostatically controlled valve 18 actuated by a thermostatic element affected by the jacket water. In the extinguished condition of the burner with the switch 89 open, the valves 76 and 86 will be closed. To light the burner, the switch 89 will be closed. This will heat the element 85 causing it to contract or shorten, thus causing the valve 86 to open. The electric heater will also heat the air in the mixing chamber causing it with the gasolene injected into it from the valve 86 to flow to the vessel 79, and, as the mixture issues through the wire gauze top of the vessel it will be ignited by the sparks at the spark plug. The flame thus surrounding the cylinder 75 will heat up the element 78 causing it to contract and open the needle valve 76 and permit gasolene to flow to the burner where it will be ignited by the flame of the pilot burner. The switch 89 may then be opened and thereafter the element 78 will be heated to maintain the valve 76 open by heat conducted down from its burner in a manner as hereinbefore described in connection with the burner 10.

While the invention has been illustrated in what are considered its best applications, it may have other embodiments and is not therefore limited to the structures shown in the drawings.

What I claim is:—

1. The combination with an internal combustion engine of a fluid jacket therefor, a burner adapted to heat the fluid of said jacket, a source of fuel supply for said burner operatively connected therewith, and means controlled by the temperature condition of the burner independently of said fluid for controlling the fuel supply to said burner.

2. The combination with an internal combustion engine of a fluid jacket therefor, a burner adapted to heat the fluid of said jacket, a source of fuel supply for said burner operatively connected therewith, means controlled by the temperature condition of the burner for controlling the fuel supply and means controlled by the heat of the jacket water for controlling the fuel supply.

3. The combination with an internal combustion engine of a fluid jacket therefor, a burner adapted to heat the fluid of said jacket, a source of fuel supply for said burner operatively connected therewith, means controlled by the heat of the jacket fluid for controlling the supply of fuel to said burner and means controlled by the heat of the burner for controlling the supply of fuel to said burner.

4. The combination with an internal combustion engine of a fluid jacket therefor, a burner adapted to heat the fluid of said jacket, a source of fuel supply for said burner operatively connected therewith, means controlled by the heat of the jacket fluid tending to decrease the flow of fluid to said burner as the heat of said jacket fluid rises, and means controlled by the condition of said burner tending to increase the fluid supply upon increase in heat.

5. The combination with an internal combustion engine of a fluid jacket therefor, a burner adapted to heat the fluid of said jacket, a source of fuel supply for said burner operatively connected thereto, and means controlled by the heat of the burner for controlling the supply of fuel to said burner and means for initially heating said fuel controlling means.

6. The combination with an internal combustion engine of a fluid jacket therefor, a burner adapted to heat the fluid of said jacket, a source of fuel supply for said burner operatively connected thereto, and means controlled by the heat of the burner for controlling the supply of fuel to said burner and an electric heater for initially heating said fuel controlling means.

7. The combination with an internal combustion engine of a fluid jacket therefor, a burner adapted to heat the fluid of said jacket, a source of fuel supply for said burner operatively connected therewith, a valve controlling said fuel supply, a thermostatic element exposed to the heat of said jacket fluid and tending on cooling to open said valve and on heating to close said valve, a second valve controlling the supply of fuel to said burner, a second thermostatic element controlling said second valve and tending to open said valve on heating and close said valve on cooling, said second thermostatic element being adapted to be heated by said burner when it is burning to maintain the said second valve open and means for initially heating said second thermostatic element to open said second valve.

8. The combination with an internal combustion engine having a fluid jacket therefor, a burner adapted to heat the fluid of said jacket, a source of fuel supply for said burner operatively connected thereto, igniting means for the burner, and means controlled by the condition of the burner for controlling said igniting means.

9. The combination with an internal combustion engine of a fluid jacket therefor, a burner adapted to heat the fluid of said jacket, an igniting means for said burner, a source of fuel supply for said burner, and means controlled by the heat of the burner for controlling said igniting means.

10. The combination with an internal combustion engine of a fluid jacket therefor, a burner adapted to heat the fluid of said jacket, a source of fuel supply for said burner operatively connected therewith, a spark plug for igniting said burner, a circuit for said spark plug and a thermostatic means controlled by the heat of said burner for controlling the circuit of said spark plug.

11. The combination with an internal combustion engine of a fluid jacket therefor, a burner adapted to heat the fluid of said jacket, a source of fuel supply for said burner operatively connected thereto, and means controlled by the heat of the burner for controlling the supply of fuel to said burner and means for initially heating said fuel controlling means, the last mentioned means being controlled by the heat of the burner.

12. The combination with an internal combustion engine of a fluid jacket therefor, a burner adapted to heat the fluid of said jacket, a source of fuel supply for said burner operatively connected thereto, means controlled by the heat of the burner for controlling the supply of fuel to said burner, means for initially heating said fuel controlling means, means for igniting the burner and means controlled by the heat of the burner for controlling said initial heating and igniting means.

13. The combination with an internal combustion engine of a fluid jacket therefor, a burner adapted to heat the fluid of said jacket, a source of fuel supply for said burner operatively connected thereto, means for controlling the fuel supply to said burner comprising a valve and a thermostatic element tending to open said valve when heated and adapted to be heated by said burner when it is ignited, an electric heater adapted to initially heat said thermostatic element, a spark plug for igniting said burner, means for supplying current to said electric heater and said spark plug, and means controlled by the heat of said burner for controlling the supply of current to said electric heater and said spark plug.

14. The combination with an internal combustion engine of a fluid jacket therefor, a burner adapted to heat the fluid of said jacket, a source of fuel supply for said burner operatively connected thereto, a valve for controlling the supply of fuel to said burner, a thermostatic element exposed to the heat of said burner and tending to open said valve when it is heated, an electric heater for initially heating said thermostatic element and a spark plug for igniting said burner, means for supplying electric current to said electric heater and to said spark plug, means controlled by the heat of said burner for controlling the supply of current to said electric heater and to said spark plug, a second valve controlling the supply of fuel to said burner, a second thermostatic element controlling said second valve and tending to close the same upon rise in temperature, said second thermostatic element being exposed to the temperature of the jacket fluid.

In testimony whereof I have signed this specification this eleventh day of June, 1919.

THOMAS A. MORRIS.